United States Patent
Duan et al.

(10) Patent No.: US 9,378,402 B2
(45) Date of Patent: Jun. 28, 2016

(54) OPTICAL INFORMATION READER AND ILLUMINATING METHOD

(71) Applicant: Optoelectronics Co., Ltd., Saitama (JP)

(72) Inventors: Zhihui Duan, Saitama (JP); Wataru Kubo, Saitama (JP)

(73) Assignee: Optoelectronics Co., Ltd., Saitama (JP)

(*) Notice: Subject to any disclaimer, the term of this patent is extended or adjusted under 35 U.S.C. 154(b) by 0 days.

(21) Appl. No.: 14/510,332

(22) Filed: Oct. 9, 2014

(65) Prior Publication Data
US 2015/0097035 A1 Apr. 9, 2015

Related U.S. Application Data

(60) Provisional application No. 61/888,827, filed on Oct. 9, 2013.

(51) Int. Cl.
*G06K 7/10* (2006.01)

(52) U.S. Cl.
CPC ........ *G06K 7/10732* (2013.01); *G06K 7/10831* (2013.01)

(58) Field of Classification Search
CPC .................. G06K 7/10732; G06K 7/10831
See application file for complete search history.

(56) References Cited

U.S. PATENT DOCUMENTS 7,909,257 B2  3/2011  Wang et al.
2011/0297853 A1*  12/2011  Liu .............. G06K 7/10831
                                               250/566

FOREIGN PATENT DOCUMENTS

JP  2009075784 A  4/2009

* cited by examiner

*Primary Examiner* — Sonji Johnson
(74) *Attorney, Agent, or Firm* — Brundidge & Stanger, P.C.

(57) ABSTRACT

A barcode reader, as an optical information reader which reads information indicated with a symbol having a light reflectance different from an ambient light reflectance, is provided with a linear sensor as a light receiving sensor, an image pickup lens to image-form light on the linear sensor, an LED as a light emitting device, a projection lens to project light emitted from the LED, a parting portion to regulate a light projection range of the light emitted from the LED, having a first opening and a second opening to shield light out of a predetermined range, a central position of the predetermined range being shifted from position of an optical axis of the projection lens to a side of an optical axis of the image pickup lens.

8 Claims, 4 Drawing Sheets

OPTICAL INFORMATION READER AND ILLUMINATING METHOD

FIELD OF THE INVENTION

The present invention relates to an optical information reader, and more particularly, to an optical information reader having a projection unit to perform light projection on a reading object. Further, the present invention also relates to an illuminating method in the optical information reader.

BACKGROUND OF THE INVENTION

In a conventional barcode reader 100 using a linear sensor, as shown in FIG. 6, a configuration in which an image pickup lens 111 and a linear sensor 101 are provided at the center of a reader casing, and a first LED (Light Emitting Diode) 102 and a second LED 103 are provided on the both sides of the linear sensor 101, is known. The first LED 102 and the second LED 103 generate respectively line-shaped aiming light 122 and aiming light 123 through a light projection lens 112 and a light projection lens 113. These aiming light partially overlap each other and become one ray of aiming light on appearance. The aiming light outputted from the first LED 102 is projected in a region between a straight line 102a and a straight line 102b, and the aiming light outputted from the second LED 103 is projected in a region between a straight line 103a and a straight line 103b.

Note that as the first LED 102 and the second LED 103 are symmetrically provided with respect to the image pickup lens 111, the center of the projected one ray of aiming light on appearance overlaps the center 101c of a field of view of the image pickup lens 111 (a region between a straight line 101a and a straight line 101b). Accordingly, when a user of the barcode reader 100 aligns the center of the aiming light with a barcode, the barcode is captured at the center of the field of view also from the viewpoint of the image pickup lens 111. The user can perform alignment between the barcode reader 100 and the barcode without awkwardness.

PTL 1 and PTL 2 disclose this type of barcode reader.

CITATION LIST

Patent Literature

{PTL1} U.S. Pat. No. 7,909,257 B2
{PTL2} JP 2009-75784 A

SUMMARY OF THE INVENTION

Technical Problem

In recent years, light emission efficiency of an LED is drastically improved. Illumination power conventionally obtained with two LEDs is realized with one LED. For the purpose of downsizing of a reader, it is advantageous to use one LED in place of two LEDs. When two LEDs are used, as the same two optical parts are necessary, it is disadvantageous in cost-down of barcode readers.

To generate aiming light using only one LED, e.g. a configuration as shown in FIG. 7 is conceivable. That is, in a casing of a barcode reader 200, an LED 202 is provided adjacently to a linear sensor 201, and a light projection lens 212 is provided adjacently to an image pickup lens 211. Then aiming light is outputted such that a straight line 201a and a straight line 201b as both sides of the field of view of the image pickup lens 211 are approximately in parallel to a straight line 202a (on the side closer to the linear sensor 201 when viewed from the LED 202) and a straight line 202b (on the side far from the linear sensor 201 when viewed from the LED 202) indicating both ends of the aiming light, respectively.

In this case, a shift corresponding to a distance of separation between the LED 202 and the image pickup lens 211 in a direction vertical to the central axis thereof occurs between the center 202c of the aiming light and the center 201c of the field of view of the image pick lens 211. Accordingly, even when a user of the barcode reader 200 aligns the center 202c of the aiming light with the barcode, when the barcode is viewed from the image pickup lens 211, it is in a position shifted from the center 201c of the field of view by the above-described shift amount.

Accordingly, when the barcode is held in the vicinity of the upper end of the aiming light for reading, as indicated with reference numeral 221a in the figure, as the barcode is out of the field of view of the image pickup lens 211 (sensor 201), the barcode cannot be read. On the other hand, when the barcode is held in the vicinity of the lower end of the aiming light, as indicated with reference numeral 211b in the figure, it is within the field of view of the image pickup lens 211 and the barcode can be read without problem. Further, even when the barcode is slightly out of the range of the aiming light, it can be read.

In this manner, the user of the barcode reader 200 feels awkwardness regarding the uneven existence of the unreadable zone.

In an optical information reader to read information indicated with a symbol having a light reflectance different from an ambient light reflectance, even when information other than barcode is read or when the reading is performed with other sensors than the linear sensor, this problem similarly occurs to a greater or lesser extent.

Object of the Invention

The present invention has been made in view of the above situation, and has an object to, even when an illumination light emitting device is provided on one side of a light receiving sensor, output aiming light appropriately indicating readable range of the light receiving sensor.

Solution to Problem

To attain the above object, an optical information reader of the present invention is an optical information reader reading information indicated with a symbol having a light reflectance different from an ambient light reflectance, including: a light receiving sensor; an image pickup lens to image-form light on the light receiving sensor; a light emitting device; a projection lens to project light emitted from the light emitting device; and a parting portion to regulate a light projection range of the light emitted from the light emitting device, by shielding light out of a predetermined range in the light emitted from the light emitting device, a central position of the predetermined range being shifted from a position of an optical axis of the projection lens to a side of an optical axis of the image pickup lens.

In such an optical information reader, it is conceivable that the parting portion regulates the light projection range with a first opening to regulate a light projection range and a second opening at a position on a projection lens side of the first opening in a light projection path of the light emitted from the light emitting device and at a position such that a central position of the second opening is shifted from the optical axis of the projection lens to the side of the optical axis of the image pickup lens.

Alternatively, it is conceivable that the parting portion regulates the light projection range with one opening at a position such that a central position of the one opening is shifted from the optical axis of the projection lens to the side of the optical axis of the image pickup lens.

Further, it is also conceivable that, at a distance farther than a shortest distance in an appropriate reading distance range of the light receiving sensor, an end of the light projection range on an opposite side to the side of the optical axis of the image pickup lens is positioned within a field of view of the image pickup lens.

Furthermore, it is also conceivable that an angle of view of the image pickup lens on an opposite side to the side of the optical axis of the projection lens and an angle of divergence of the light projection range on the side of the optical axis of the image pickup lens are equal.

Alternatively, it is conceivable that, within a range to a longest distance of an appropriate reading distance range of the light receiving sensor, an end of the light projection range on the side of the optical axis of the image pickup lens is positioned within the field of view of the image pickup lens.

The above-described optical information reader has e.g. one reading sensor unit (including an image pickup lens and the like) and one illumination LED unit (it may be provided with plural light emitting points) provided on one side of the sensor unit. Information on the object of reading with the reading sensor unit is e.g. a code symbol such as a barcode symbol.

The illumination LED unit is used to generate aiming light to indicate the readable range of the sensor.

The optical information reader may be arranged such that on the side closer to the sensor (the side where the sensor exists), the illumination light (aiming light) from the illumination LED unit irradiates a range approximately parallel to the readable range of the sensor, and on the side far from the sensor (the opposite side to the sensor), the illumination light is slightly narrowed and emitted so as to intersect the readable range at the shortest distance (e.g. about 60 mm) in the appropriate reading distance range of the sensor (in a position far from the distance, the illumination light is within the readable range).

The illumination light from the illumination LED unit is realized by combining a first slit plate having one opening provided on the illumination side (reading object side) of the illumination LED unit and a second slit plate having one opening provided on further illumination side, and by setting the relative positional relation between the first and second openings asymmetrically with respect to the center of light emitting point of the illumination LED. In this case, the first slit plate is used to shape the illumination beam from the illumination LED into an appropriate shape of aiming light. The second slit plate is used to block off the end of the beam passed through the first slit plate and adjust the width of the aiming light to the readable range of the sensor.

More particularly, the positional relation between the first opening and the second opening with respect to the center of the light emitting point of the illumination LED unit is set to be asymmetric as above by shifting the second opening to the side closer to the sensor in comparison with the first opening.

The aiming light may be realized by using three or more slit plates. In the above description, the aiming light is generated with the slit plates, however, the opening may be integrally formed by molding or the like in place of using the slit plates.

Conversely, the optical information reader may be arranged such that the aiming light is realized by providing one opening having an asymmetrical shape with respect to the central position of the light emitting point of the illumination LED unit (the side far from the sensor is narrower than the side closer to the sensor), on the irradiation side of the illumination LED, and passing the light emitted from the illumination LED unit through the opening. The one opening has the functions of the opening of the first slit plate and the opening of the second slit plate.

Further, in the above description, in the aiming light, the irradiation range on the side closer to the sensor is approximately parallel to the readable range. However, the irradiation range may be slightly widened such that the irradiation range intersects the readable range in a position farther than the farthest position in the appropriate reading distance range (e.g. about 200 mm) (in the still farther positions, the irradiation range comes outside the reading appropriate range scale).

The opening of the slit plate may have e.g. a rectangular shape. However, as long as the above-described irradiation range is realized, the shape of the opening is not limited to the rectangle.

Further, the optical information reader according to the present invention is an optical information reader reading information indicated with a symbol having a light reflectance different from an ambient light reflectance, having a light receiving sensor, one image pickup lens to image-form the light on the light receiving sensor, and one light emitting device. In the optical information reader, the entire illumination range of the aiming light is set such that inner side (the side where the light receiving sensor exists) width of light projection of the aiming light outputted from the light emitting device is the same as the field of view of the image pickup lens, and outer side (the opposite side to the light receiving sensor) width of light projection of the aiming light is within the field of view of the image pickup lens from a predetermined distance. The predetermined distance is approximately the shortest distance (e.g. about 60 mm) of the information readable range. The setting of the illumination range of the aiming light is performed by providing a first opening on reading object side of the light emitting device, providing a second opening on further reading object side thereof, and shifting the center of the second opening to the image pickup lens side (sensor side) from the center of the first opening, thereby arranging a light projection optical path.

It is also conceivable that the first opening, the center of which is provided in a position shifted from the light emitting central point of the light emitting device to the image pickup lens side (sensor side), is used in place of the first and second openings.

The present invention can be realized also as an illuminating method in an optical information reader, other than the above described devices.

Advantageous Effects of Invention

According to the present invention having the above configuration, even when an illumination light emitting device is provided on one side of a light receiving sensor, it is possible to output aiming light appropriately indicating a readable range of the light receiving sensor.

DETAILED DESCRIPTION

Hereinbelow, an embodiment of the present invention will be described based on the drawings.

Figure 1:
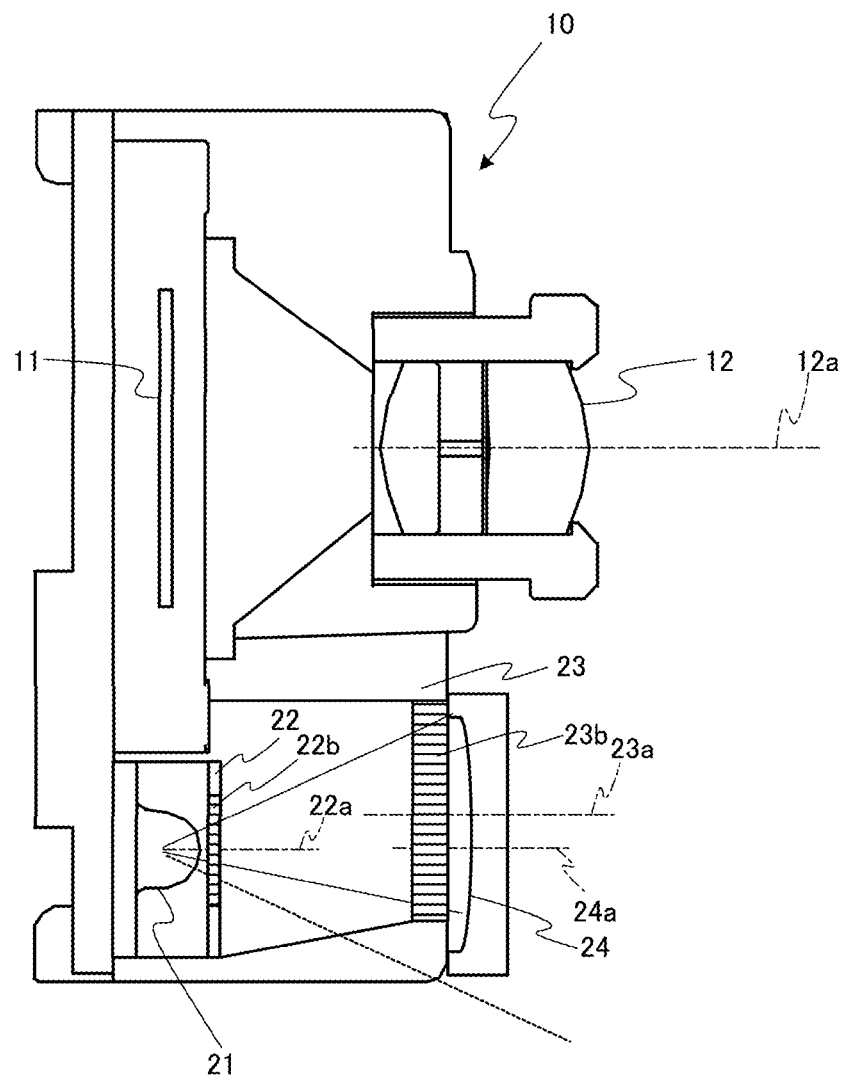
FIG. 1 is a schematic cross-sectional diagram of a barcode reader 10 as an embodiment of an optical information reader of the present invention.

First, FIG. 1 shows a schematic cross-sectional diagram of a barcode reader 10 as an embodiment of an optical information reader in the present invention. FIG. 1 illustrates configuration of the barcode reader 10 especially showing positional relation among a light receiving sensor, a light emitting device and openings.

The barcode reader 10 shown in FIG. 1 is a device to read a barcode symbol as information indicated with a symbol having a light reflectance different from an ambient light reflectance.

The barcode reader 10 has an image pickup lens 12 as an image pickup optical system and a linear sensor 11 as a light receiving sensor, and image-forms reflected light from a barcode symbol as a reading object with the image pickup lens 12 on the linear sensor 11. The linear sensor 11, in which CCDs (Charge Coupled Devices) are linearly arrayed, obtains light quantities of the image-formed barcode symbol image in the respective positions. The barcode reader 10 specifies alignment sequence of white bars and black bars of the barcode as the reading object based on the obtained light quantities, and reads the barcode symbol.

Further, the barcode reader 10 has an LED 21 as a light emitting device to project aiming light, on one side of the linear sensor 11. Further, the barcode reader 10 has a first parting portion 22 having a first opening 22b on a side where the barcode symbol exists in reading the barcode symbol when viewed from the LED 21 (in the figure, the right side i.e. "the reading object side"), and has a second parting portion 23 having a second opening 23b on the further reading object side, i.e., on the rear side on the light projection path. Further, the barcode reader 10 has a projection lens 24 on the reading object side of the second opening 23b.

Note that the first parting portion 22 and the second parting portion 23 may be respectively formed with a slit plate, however, in this example, they are integrally formed by molding with the exterior of the barcode reader 10.

Figure 2:
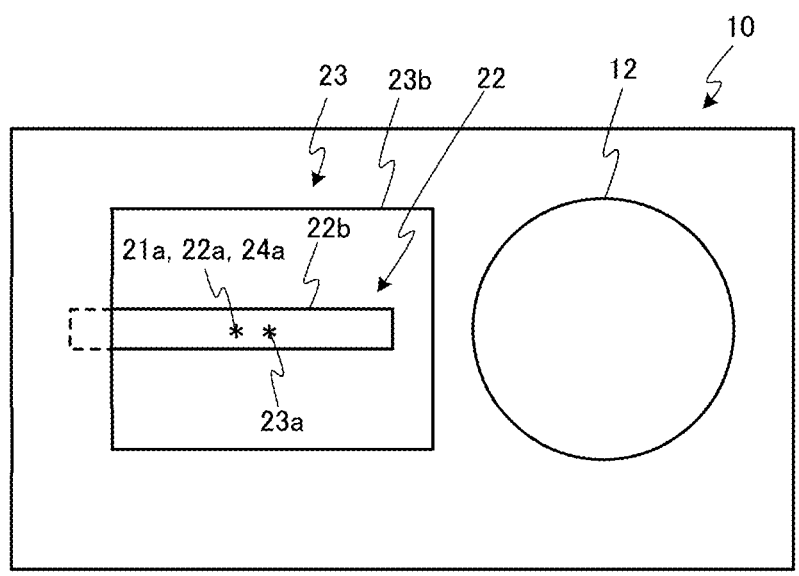
FIG. 2 illustrates positional relation between a light emitting point 21a of an LED 21, and a first opening 22 and a second opening 23.

FIG. 2 illustrates positional relation between the light emitting point 21a of the LED 21, and the first opening 22b and the second opening 23b. FIG. 2 is a diagram viewed from the reading object side in an optic-axial direction of the image pickup lens 12.

As shown in FIG. 2, the first opening 22b is an about 0.5 mm×3.0 mm laterally slit-shaped hole to regulate light projection range of the light emitted from the LED 21. Further, the first opening 22b is provided at a position where a central axis 22a of the first opening 22b corresponds with position of the light emitting point 21a of the LED 21. An optical axis 24a of the projection lens 24 is also provided at a position corresponding to the central axis 22a of the first opening 22b. This arrangement is to obtain linear aiming light having homogeneous light quantity distribution when it is assumed that the illumination light outputted from the LED 21 passes through the first opening 22b and then passes through the projection lens 24 as it is to be projected to the outside. Further, the aiming light in this assumed case has a symmetrical shape with respect to the central axis 22a of the first opening 22b.

However, the barcode reader 10 is provided with the second opening 23b to further regulate the light projection range by parting (shielding) one end of the light which passed through the first opening 22b.

As shown in FIG. 2, the second opening 23b also is a lateral slit-shaped opening having a wider opening area than the first opening 22b. However, the central axis 23a of the second opening 23b is slightly shifted from the central axis 22a of the first opening 22b to the image pickup lens 12 side (linear sensor 11 side). Accordingly, a part of the illumination light, which passed through the first opening 22b, on the opposite side to the image pickup lens 12 (the outside, the left side in FIG. 2) cannot pass through the second opening 23b, and is blocked off with the second parting portion 23 having the second opening 23b.

Then the aiming light passed through the second opening 23b and the projection lens 24 becomes such that, with respect to the central axis 22a of the first opening 22b and the optical axis 24a of the projection lens 24 (the both are parallel to an optical axis 12a of the image pickup lens 12), spread angle of the side closer to the image pickup lens 12 is wider than spread angle of the side far from the image pickup lens 12. That is, in the light emitted from the LED 21, the light out of a predetermined range, in which the central position is shifted from the position of the optical axis 24a of the projection lens 24 to the optical axis 12a side of the image pickup lens 12, is shielded, and the light projection range is regulated with the first parting portion 22 and the second parting portion 23, and the light within the not-shielded range is irradiated as the aiming light to the outside.

Figure 3:
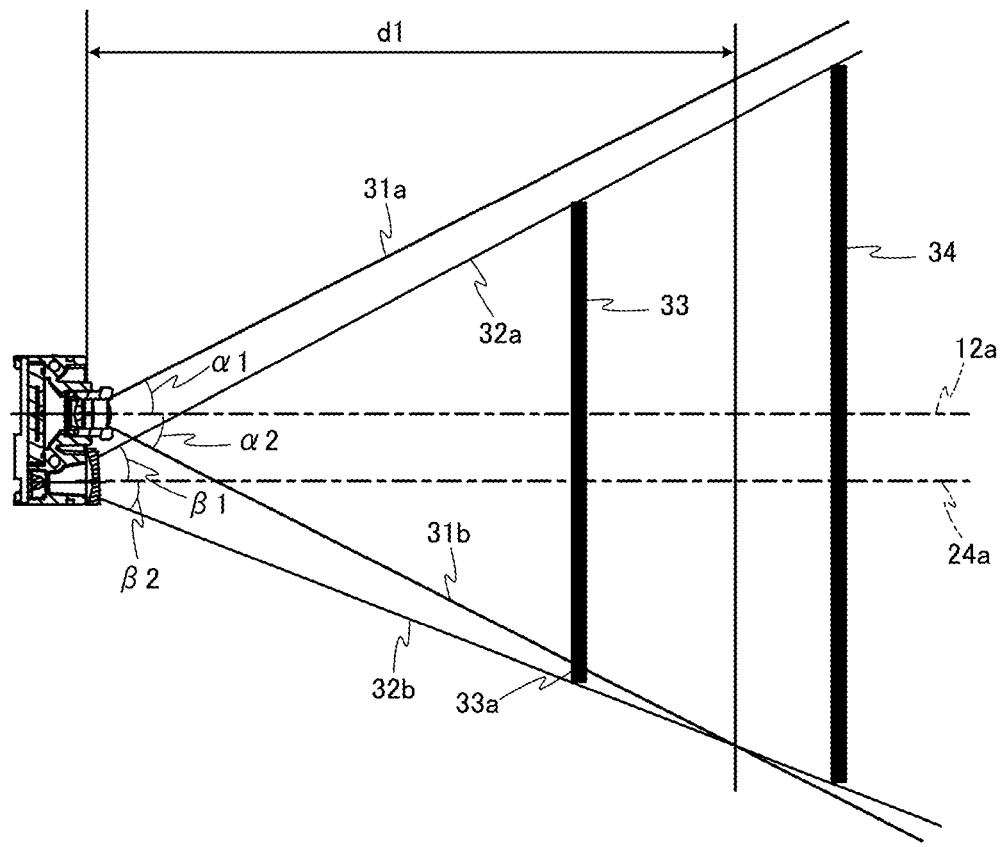
FIG. 3 illustrates relation between field of view of an image pickup lens 12 and illumination range of aiming light.

FIG. 3 illustrates relation between field of view of the image pickup lens 12 (readable range of the linear sensor 11) and the irradiation range of the aiming light.

As shown in FIG. 3, the field of view of the image pickup lens 12 is a region between a straight line 31a and a straight line 31b. In this example, an angle α1 between the optical axis 12a of the image pickup lens 12 and the straight line 31a and an angle α2 between the optical axis 12a and the straight line 31b are both 27°.

Further, the irradiation range of the aiming light is a region between a straight line 32a and a straight line 32b. The positions of the straight line 32a and the straight line 32b are determined based on positional relation among the LED 21, the first opening 22b and the second opening 23b. In this example, with respect to the optical axis 24a of the projection lens 24 as a light projection axis of the aiming light, an angle β1 between the optical axis 24a and the straight line 32a (angle of divergence on the optical axis 12a of the image pickup lens 12 side) is 27°, and an angle β2 between the optical axis 24a and the straight line 32b (angle of divergence on the opposite side to the optical axis 12a of the image pickup lens 12) is 22°. That is, β1>β2 holds, and the aiming light is asymmetric with respect to the light projection axis. The asymmetric aiming light is obtained by providing the second opening 23b at a position asymmetrical to the optical axis 24a.

Note that as β2<α2 holds, on the opposite side to the image pickup lens 12, the field of view of the image pickup lens 12 intersects the light projection range of the aiming light in some position. In this example, the intersecting position is at a shortest distance d1 in the appropriate reading distance range of the linear sensor 11 (e.g. about 60 mm). The appropriate reading distance range is a range of distance indicating a bar code symbol as a reading object placed how far from the linear sensor 11 can form an image having a resolution enough to obtain a decodable signal on the linear sensor 11. The shortest distance d1 is a minimum distance to form a decodable barcode symbol image with the image pickup lens 12 on the linear sensor 11.

In this arrangement, at a distance from the shortest distance d1, the light projection range of the aiming light, including its ends, falls within the field of view of the image pickup lens 12 as indicated with reference numeral 34. Accordingly, it is possible to avoid an inconvenience that reading cannot be performed even though a barcode symbol is set to the position of the aiming light. That is, there is no dead zone of the aiming light.

In a position closer than the shortest distance d1, an end 33a of the aiming light is out of the field of view of the image pickup lens 12, as indicated with reference numeral 33. However, this distance is not used in barcode symbol reading, this does not become a problem.

Note that as $\beta1=\alpha1$ holds, on the image pickup lens 12 side of the aiming light, the light projection range of the aiming light is approximately parallel to the field of view of the image pickup lens 12, and the light projection range falls within the field of view of the image pickup lens 12. Accordingly, the problem that the barcode symbol positioned to the aiming light is out of the field of view of the image pickup lens 12 (the readable range of the linear sensor 11) does not occur at any reading distance.

Accordingly, according to the configuration of FIG. 3, the illumination range of the aiming light falls within the field of view of the image pickup lens (sensor) from the readable shortest distance to infinite distance, and there is no reading dead zone of the aiming light.

As described above, according to the configuration in FIG. 1 to FIG. 3, it is possible to output aiming light appropriately indicating a sensor readable range by appropriately arranging openings to obtain aiming light asymmetric with respect to a light projection axis.

Figure 4:
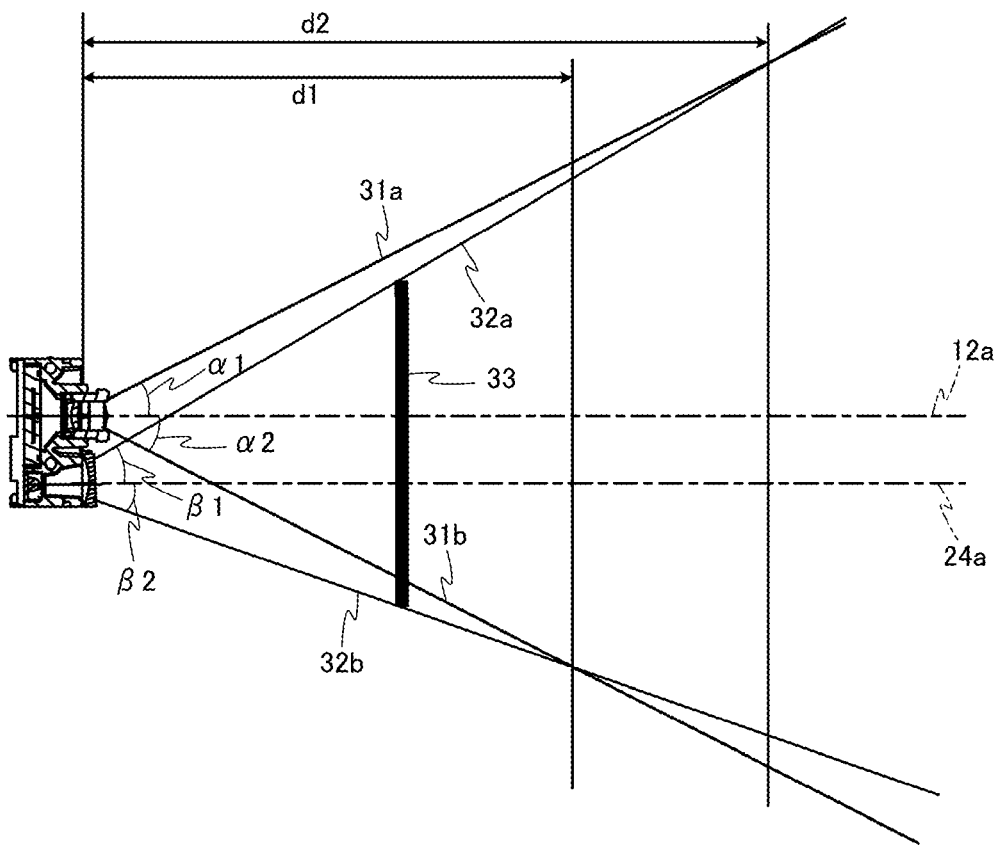
FIG. 4 illustrates another example of relation between field of view of the image pickup lens 12 and illumination range of aiming light.

Next, FIG. 4 shows another example of relation between the field of view of the image pickup lens 12 and irradiation range of the aiming light.

In this example, $\beta1>\alpha1$ holes on the image pickup lens 12 side of the aiming light, such that the field of view of the image pickup lens 12 and the light projection range of the aiming light intersect at a longest distance d2 (e.g. about 200 mm) in the appropriate reading distance range of the linear sensor 11.

With this arrangement, on the image pickup lens 12 side of the aiming light, it is possible to narrow the interval between the field of view of the image pickup lens 12 and the light projection range of the aiming light, in comparison with the case of FIG. 3 to project the aiming light in a range closer to the field of view of the image pickup lens 12. In the configuration of FIG. 4, the end of the aiming light is within the field of view of the image pickup lens 12 in the range to the longest distance d2.

Note that at a distance farther than the distance d2, the end of the aiming light is out of the field of view of the image pickup lens 12. However, this distance is not used in barcode symbol reading, this does not become a problem. However, the intersecting point may be farther than the distance d2.

The embodiment is as described above. It is apparent that the device configuration, the sensors, the reading object information, the number and arrangement of the slits and the like are not limited to those in the above-described embodiment.

Figure 5:
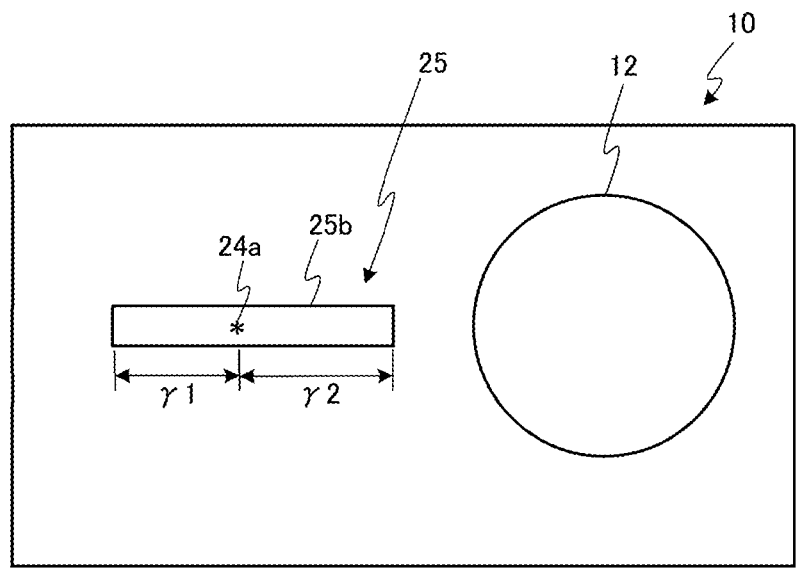
FIG. 5 illustrates another example of the opening.
Figure 6:
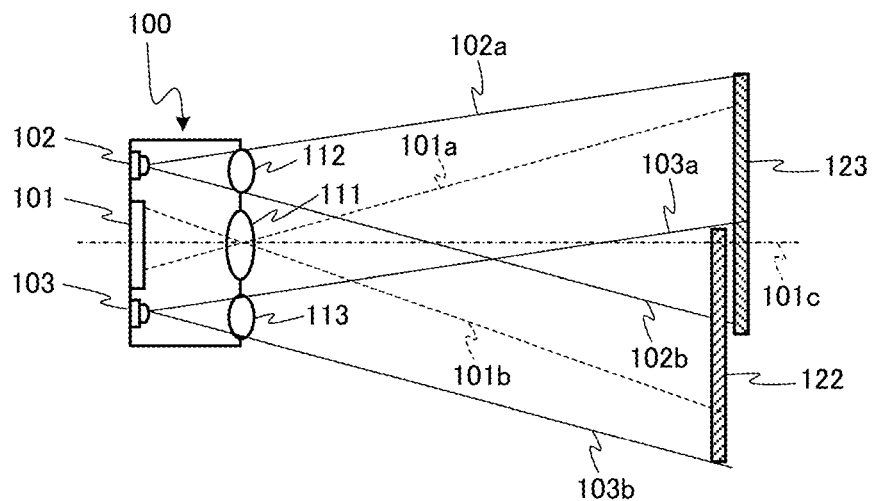
FIG. 6 illustrates an example of configuration of a conventional barcode reader.
Figure 7:
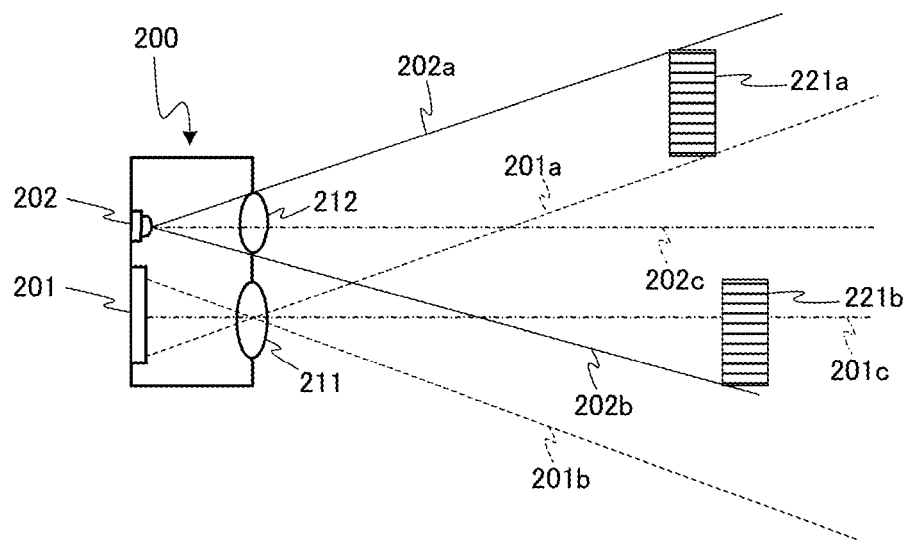
FIG. 7 illustrates an example of configuration of a barcode reader to generate aiming light using one LED.

For example, as shown in FIG. 5, a parting portion 25 having an opening 25b with the functions of the first opening 22b and the second opening 23b may be provided. The opening 25b is provided at a position asymmetric with respect to the optical axis 24a of the projection lens 24. That is, $\gamma1<\gamma2$ holds. It is also possible to obtain the aiming light asymmetric with respect to the light projection axis as shown in FIG. 3 and FIG. 4 by using the opening 25b.

Further, it goes without saying that arbitrary combinations of the constituent elements of the above-described embodiment and modifications are implementable as long as they mutually contradict.

INDUSTRIAL APPLICABILITY

According to the above-described optical information reader and illuminating method, even when a light emitting device for illumination is provided on one side of a light receiving sensor, it is possible to output aiming light appropriately indicating a readable range of a light receiving sensor. Accordingly, it is possible to output appropriate aiming light with only one light emitting device, and it is possible to reduce costs of optical information readers.

REFERENCE SIGNS LIST

10 . . . barcode reader, 11 . . . linear sensor, 12 . . . image pickup lens, 12a . . . optical axis, 21 . . . LED, 22 . . . first parting portion, 22a . . . central axis, 22b . . . first opening, 23 . . . second parting portion, 23b . . . second opening, 24 . . . projection lens, 24a . . . optical axis, 25 . . . parting portion, 25b . . . opening

What is claimed is:

1. An optical information reader reading information indicated with a symbol having a light reflectance different from an ambient light reflectance, comprising:
   a light receiving sensor;
   an image pickup lens configured to image-form light on the light receiving sensor;
   a light emitting device;
   a projection lens configured to project light emitted from the light emitting device;
   and
   a parting portion configured to regulate a light projection range of the light emitted from the light emitting device by shielding a part of the light emitted from the light emitting device so that a central position of a range of the light passed through the parting portion is shifted from a position of an optical axis of the projection lens to a side of an optical axis of the image pickup lens,
      wherein an angle of view of the image pickup lens on an opposite side to the side of the optical axis of the projection lens is equal to an angle of divergence of the light projection range on the side of the optical axis of the image pickup lens.

2. The optical information reader according to claim 1, wherein the parting portion regulates the light projection range with a first opening to regulate a light projection range and a second opening at a position on a projection lens side of the first opening in a light projection path of the light emitted from the light emitting device and at a position such that a central position of the second opening is shifted from the optical axis of the projection lens to the side of the optical axis of the image pickup lens.

3. The optical information reader according to claim 1, wherein the parting portion regulates the light projection range with one opening at a position such that a central position of the one opening is shifted from the optical axis of the projection lens to the side of the optical axis of the image pickup lens.

4. The optical information reader according to claim 1, wherein within a range to a longest distance of an appropriate reading distance range of the light receiving sensor, an end of the light projection range on the side of the optical axis of the image pickup lens is positioned within the field of view of the image pickup lens.

5. An illuminating method related to an optical information reader reading information indicated with a symbol having a light reflectance different from an ambient light reflectance, comprising:
    shielding a part of light emitted from a light emitting device by a parting portion;
    projecting light passed through the parting portion to an object, shifting a central position of a range of the light passed through the parting portion from a position of an optical axis of a projection lens and projecting light emitted from the light emitting device to a side of an optical axis of an image pickup lens and imaging-forming light on a light receiving sensor, wherein an angle of view of the image pickup lens on an opposite side to the side of the optical axis of the projection lens is equal to an angle of divergence of a light projection range of the light emitted from the light emitting device on the side of the optical axis of the image pickup lens.

6. The illuminating method according to claim 5, wherein the parting portion regulates a light projection range of the light emitted from the light emitting device with a first opening to regulate a light projection range and a second opening at a position on a projection lens side of the first opening in a light projection path of the light emitted from the light emitting device and at a position such that a central position of the second opening is shifted from the optical axis of the projection lens to the side of the optical axis of the image pickup lens.

7. The illuminating method according to claim 5, wherein the parting portion regulates a light projection range of the light emitted from the light emitting device with one opening at a position such that a central position of the one opening is shifted from the optical axis of the projection lens to the side of the optical axis of the image pickup lens.

8. The illuminating method according to claim 5, wherein within a range to a longest distance of an appropriate reading distance range of the light receiving sensor, an end of a light projection range of the light emitted from the light emitting device on the side of the optical axis of the image pickup lens is positioned within the field of view of the image pickup lens.

\* \* \* \* \*